(12) United States Patent
McElrath et al.

(10) Patent No.: US 6,837,288 B2
(45) Date of Patent: Jan. 4, 2005

(54) COMPOSITION FOR TIRE SIDEWALLS AND OTHER RUBBER CONSTRUCTIONS

(75) Inventors: Kenneth Odell McElrath, Houston, TX (US); Mun-Fu Tse, Seabrook, TX (US); Andrew Louis Tisler, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 229 days.

(21) Appl. No.: 10/040,778

(22) Filed: Jan. 2, 2002

(65) Prior Publication Data

US 2002/0100530 A1 Aug. 1, 2002

Related U.S. Application Data

(62) Division of application No. 09/071,105, filed on May 1, 1998, now Pat. No. 6,374,889.
(60) Provisional application No. 60/045,632, filed on May 5, 1997, and provisional application No. 60/062,591, filed on Oct. 20, 1997.

(51) Int. Cl.$^7$ .......................... B60C 13/00; B60C 1/00
(52) U.S. Cl. ....................... 152/525; 525/209; 525/241
(58) Field of Search ...................... 152/525, DIG. 12

(56) References Cited

U.S. PATENT DOCUMENTS

| | | | |
|---|---|---|---|
| 4,548,995 A | 10/1985 | Kowalski et al. | ........... 525/354 |
| 5,162,445 A | 11/1992 | Powers et al. | ........... 525/333.4 |
| 5,376,438 A | 12/1994 | Costemalle et al. | ........ 428/216 |
| 5,504,164 A | 4/1996 | O'Donnell | ................. 525/346 |
| 5,532,312 A * | 7/1996 | Gursky et al. | ............... 525/232 |
| 5,656,694 A | 8/1997 | Frechet et al. | ............... 525/195 |
| 5,714,022 A | 2/1998 | Nagao et al. | ................ 152/525 |
| 5,959,049 A | 9/1999 | Powers et al. | .............. 526/185 |

FOREIGN PATENT DOCUMENTS

| | | |
|---|---|---|
| EP | 0 738 754 A | 10/1996 |
| EP | 0 801 106 A | 10/1997 |
| JP | 06240050 * | 8/1994 |
| WO | WO 91/05666 | 5/1991 |
| WO | WO 92/03302 | 3/1992 |

OTHER PUBLICATIONS

Abstract 38848, Research Disclosure, Kenneth Mason Publications Ltd., p. 513–4. (Aug. 1996).
Abstract 38830, Research Disclosure, Kenneth Mason Publications Ltd., p. 490–1. (Aug. 1996).
ASTM D 2084–95—"Standard Test Method for Rubber Property—Vulcanization Using Oscillating Disk Cure Meter".
Vanderbilt Rubber Handbook (1990), pp. 605.

* cited by examiner

Primary Examiner—Blaine Copenheaver
Assistant Examiner—Justin Fischer
(74) Attorney, Agent, or Firm—Kevin M. Faulkner; Leandro Arechederra

(57) ABSTRACT

Rubber blends of brominated isobutylene/para-methylstyrene copolymers of 9.5 to 20 weight percent aromatic monomer content and 0.2 to 1.0 mole percent benzylic bromine content. The blends have good cure characteristics, good adhesion and flex crack resistance, as well as ozone resistance. The blends are useful in tire sidewalls, and other applications.

15 Claims, No Drawings

COMPOSITION FOR TIRE SIDEWALLS AND OTHER RUBBER CONSTRUCTIONS

The present application is a Divisional application of U.S. Ser. No. 09/071,105, filed on May 1, 1998, now U.S. Pat. No. 6,374,889, which claims priority to Provisional Applications U.S. Ser. No. 60/045,632 filed May 5, 1997, and U.S. Ser. No. 60/062,591 filed Oct. 20, 1997.

FIELD OF THE INVENTION

The present invention relates to compositions for making tire sidewalls and other rubber constructions which exhibit improved ozone resistance and fatigue crack propagation resistance, as well as a reduction in staining and discoloration. The composition comprises a blend of halogenated copolymer of isoolefin and para-alkylstyrene of relatively high aromatic comonomer content and relatively low halogen content with general purpose rubbers (GPR) such as butadiene rubber (BR), natural rubber (NR) and/or isoprene rubber (IR). The tire sidewall may comprise a single layer or a veneer construction wherein an outer layer comprises the blend of the halogenated copolymer with one or more general purpose rubbers, and an inner layer can comprise a blend of general purpose rubbers.

BACKGROUND OF THE INVENTION

Rubber tires, such as pneumatic tires, include many components, such as, for example, sidewalls. Sidewalls are continuously subjected to distortion under normal road operating conditions. The sidewalls are subjected to extensive continuous flexing and can crack under such conditions. In addition to flex cracking, sidewalls are also subjected to atmospheric chemical action such as ozone attack. The overall effect is that the sidewalls may erode and degrade. The sidewall may even separate from the tire carcass during use, leading to tire failure.

To reduce the problems caused by ozone attack and flex cracking, tire manufacturers add chemical protectants to the general purpose rubbers used in tire sidewalls. The problem with these protectants is that they tend to be fugitive and can cause staining when in contact with white sidewalls. In some cases, particularly in white sidewalls, polymer blends have been used to effect improvements in ozone and flex resistance.

Published International application PCT/US91/05666 filed Aug. 9, 1991 discloses a tire sidewall composition comprising a single layer prepared from a blend of a halogenated copolymer of isoolefin and para-alkylstyrene with one or more general purpose rubbers.

U.S. Pat. No. 5,376,438 to Costemalle et al discloses multi-layer tire sidewalls having an outer layer prepared from a blend of halogenated isomonoolefin/para-alkylstyrene copolymer and general purpose rubbers. The inner layer comprises general purpose rubber. The sidewalls are said to exhibit good ozone resistance and fatigue crack resistance as well as a reduction in staining and discoloration. This patent is hereby incorporated herein by reference in its entirety.

In the prior art, the halogen content of the halogenated isoolefin/para-alkylstyrene copolymers generally varied proportionately with the para-alkylstyrene content, e.g. higher para-methylstyrene content was used to get a higher halogen content. If the copolymer was excessively halogenated, some undesirable dihalo benzylic substitution would occur. Thus, excess para-methylstyrene was usually used. In tire sidewall compositions of the prior art, a relatively high bromine level was needed to achieve adhesion and ozone resistance, but such high bromination levels led to relatively tight cures and crack propagation. It would be desirable to be able to use a rubber blend of the halogenated isoolefin/para-alkylstyrene copolymer that has both good adhesion and ozone resistance, as well as flex crack resistance and cure properties.

SUMMARY OF THE INVENTION

It has been found that the use of blends of halogenated copolymers of isoolefin and para-alkylstyrene having specific contents of aromatic monomers and halogenation, with general purpose rubbers yield tire sidewall compositions having significantly improved ozone resistance and fatigue crack propagation resistance. It has now been discovered that excellent curing and crack propagation resistance can be achieved simultaneously with good adhesion and ozone resistance by using a relatively low halogenation content in combination with a relatively high aromatic or para-alkylstyrene content.

In one aspect, the invention is a blend of rubber and a brominated copolymer of an isoolefin and a para-alkylstyrene. The copolymer comprises at least 9.5 but less than 20 weight percent of aromatic monomers (styrenics), and at least 0.2 but less than 1 mole percent para-bromoalkylstyrene. The blend preferably comprises from 35 to 65 phr of the copolymer, and from 35 to 65 phr of the general purpose rubber. The styrenics can include para-alkylstyrene, brominated para-alkylstyrene, alpha-methylstyrene, brominated alpha-methylstyrene or combinations thereof. The isoolefin is preferably isobutylene, whereas the para-alkylstyrene is preferably para-methylstyrene and the para-bromoalkylstyrene is preferably para-bromomethylstyrene. The general purpose rubber can be a natural rubber, styrene-butadiene rubber, polybutadiene rubber and combinations thereof. The copolymer preferably comprises from 12 to 17 weight percent unbrominated styrenics, and from 0.4 to 0.8 mole percent para-bromoalkylstyrene.

In another aspect, the invention provides a tire sidewall comprising a layer of the blend described above. The blend can also be used in a veneered tire sidewall wherein an outer layer comprises the blend described above, and an inner layer comprises a highly unsaturated rubber or blend of unsaturated rubbers.

In a further aspect, the invention provides an improvement in a tire sidewall comprising at least an outer layer comprising a blend of a copolymer of an isoolefin and a para-alkylstyrene and an unsaturated rubber, and an inner layer optionally comprising a highly saturated rubber or blend of unsaturated rubbers. The improvement is that the copolymer comprises from 9.5 to 20 weight percent aromatic monomers and from 0.2 to 1.0 mole percent para-bromoalkylstyrene.

Preferably, the blend contains quantities of bromoalkylstyrene and para-alkylstyrene which satisfy the following formula:

$$X = [1.91 - (0.094 \times Y)] \pm 0.1$$

where "X" is mole percent bromoalkylstyrene and "Y" is weight percent para-alkylstyrene (between the proposed limits of 9.5 to 20 weight percent). "±0.1" as used herein indicates that the value X may be any number within the range of 0.1 above to 0.1 below $[1.91-(0.094 \times Y)]$. The bromoalkylstyrene is preferably para-bromomethylstyrene and the para-alkylstyrene is preferably para-methylstyrene.

More preferably, the blend of the present invention has 0.96 mole percent para-bromomethylstyrene and 10 weight percent para-methylstyrene. Alternatively, the blend of the present invention preferably has 0.84 mole percent para-bromomethylstyrene and 12.5 weight percent para-methylstyrene.

In the preferred embodiment, the polymerized para-alkylstyrene comonomer unit is characterized by the formula:

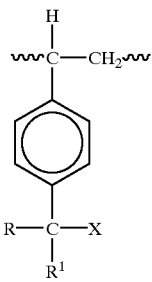

wherein R and $R^1$ are independently selected from the group consisting of hydrogen, alkyl groups having from 1 to about 5 carbon atoms, and primary and secondary alkyl halides having from 1 to about 5 carbon atoms, and x is selected from the halogen group consisting primarily of bromine, chlorine and mixtures thereof Furthermore, the halogenated para-alkylstyrene unit is shown as being pendant from the isoolefin polymer chain, represented by the wavy lines in the formula.

The tire sidewall composition and layers of the present invention can be compounded by methods generally known in the art, such as by mixing with the uncured polymers various fillers such as titanium dioxide; carbon black, when black sidewalls are desired, or non-black fillers and pigments; extenders such as rubber process oils; curing aids such as zinc oxide, sulfur; accelerators or retarders and other additives such as antioxidants and antiozonants.

DETAILED DESCRIPTION OF THE INVENTION

The principal advantages realized by practice of the present invention primarily stem from the fact that by employing a blend of copolymer of an isoolefin and para-alkylstyrene with general purpose rubbers (GPR), wherein the copolymer has a low halogen content but high aromatics content, superior ozone resistance and flex fatigue crack resistance and adhesion can be achieved at the same time.

The invention in one embodiment involves the construction of a multi-layered tire sidewall, the outer layer of which comprises a blend of a copolymer of an isoolefin and para-alkylstyrene with one or more unsaturated rubbers (GPR). The sidewall also comprises one or more layers constructed from conventional sidewall compositions such as those discussed in "The Vanderbilt Rubber Handbook" pp. 605 (1990).

The outer layer of the sidewall is fabricated from a blend composition comprising at least one highly unsaturated rubber selected from the group consisting of natural rubber, SBR rubber, polyisoprene and polybutadiene rubber; and a halogenated copolymer of an isoolefin and a para-alkylstyrene unit. In a particularly preferred composition useful in tire sidewalls, the halogenated copolymer comprises about 35 to 65 parts, for example, 40 parts, and the unsaturated rubber desirably comprises from 35 to 65 parts natural rubber and/or polybutadiene rubber. The outer layer blend may also optionally include from about 1 to about 90 preferably from about 5 to about 20 parts per hundred of ethylene-propylene-diene rubber (EPDM). The highly unsaturated rubber component of the outer layer may consist of a blend or mixture of two or more highly unsaturated rubbers. These optional rubbers may also contain aromatic monomers to improve their compatibility.

When white sidewalls are desired, particularly preferred outer layer compositions comprise the halogenated para-alkylstyrene copolymer and natural rubber in a weight ratio of halogenated para-alkylstyrene copolymer to natural rubber ranging from about 0.28:1 to about 3:1, preferably about 0.67:1 to about 1:1. The preferred halogenated para-alkylstyrene copolymer for white sidewall outer layers comprises preferably from about 9.5 to 20, more preferably from about 12 to about 17 weight percent para-alkylstyrene moieties and preferably from about 0.2 to about 1.0 mole percent, more preferably 0.4 to 0.8 mole percent halogenated para-alkylstyrene.

In a multi-layered construction, the inner layer or layers comprise one or more unsaturated rubbers selected from the group comprising natural rubber, styrene butadiene rubber, polybutadiene rubber. Typically such compositions comprise blends of natural rubber and polybutadiene rubber or blends of styrene butadiene rubber and polybutadiene rubber. The inner layer may also comprise fillers such as oils and antiozonants and other additives well known in the art.

The highly unsaturated rubbers are selected from the group consisting of natural rubbers, polyisoprene rubbers, styrene butadiene rubber (SBR) and polybutadiene rubber and mixtures thereof The natural rubbers are selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of about 30 to about 120, more preferably about 40 to about 65. Comparable Indonesian rubbers, with SIR pre-fixes, may also be used. The Mooney viscosity test referred to herein is in accordance with ASTM D-1646.

The Mooney viscosity of the polybutadiene rubber as measured at 100° C. (ML 1+4) may range from about 40 to about 70, more preferably about 45 to about 65, and most preferably about 50 to about 60. When both natural rubber and polybutadiene rubber are used, ranges from about 100 to 1 to 1 to 100, more preferably 5 to 1 to 1 to 5, and most preferably 2 to 1 to 1 to 2 are suggested.

EPDM is the ASTM designation for a terpolymer of ethylene, propylene and a non-conjugated diolefin. In such terpolymers the ethylene and propylene form a fully saturate backbone of methylene linkages with the non-conjugated diolefin, e.g. dicyclopentadiene or substituted norbornene, attached so as to provide unsaturated side chains with readily available crosslinking sites for sulfur curing. The EPDM elastomers thus contain a fully saturated backbone which provides outstanding resistance to oxidation, ozone, and cracking, as well as excellent low temperature flexibility. The Mooney viscosity of the EPDM terpolymer as measured at 125° C. is about 20 to 80, more preferably about 25 to 75 and most preferably about 40 to about 60. The ethylene content of the EPDM terpolymers may range from about 20 to about 90 weight percent, preferably from about 30 to about 85, more preferably from about 35 to about 80 weight percent. The total diene monomer content in the EPDM terpolymers may suitably range from about 0.1 to about 15 weight percent, preferably from about 0.5 to about 12 weight percent.

The non-conjugated dienes may be straight chain or cyclic hydrocarbon diolefins having from 6 to 15 carbon atoms, such as dicyclopentadiene, including 5-methylene-2-norbornene, 5-vinyl-2-norbornene, 2-methylnorbornadiene, 2, 4-dimethyl-2,7-octadiene, 1,4-hexadiene and 5-ethylidene-2-norbornene. The more preferred compounds include 5-methylene-2-norbornene, dicyclopentadiene, 1,4-hexadiene and 5-ethyliene, dicyclopenta-diene, 1,4-hexadiene and 5-ethylidene-2-norbornene. A preferred EPDM terpolymer is VISTALON® 6505 manufactured by Exxon Chemical Company.

The term "butyl rubber" as employed herein is intended to refer to a vulcanizable rubbery copolymer containing, by weight, from about 85 to 99.5% combined isoolefin having from 4 to 8 carbon atoms. Such copolymers and their preparation are well known. The butyl rubber may be halogenated by means known in the art. The Mooney viscosity of the halobutyl rubbers useful in the instant invention are measured at 125° C. (ML 1+4) range from about 20 to about 80, more preferably about 25 to about 55, and most preferably about 30 to about 50.

Suitable halogen-containing copolymers of a $C_4$ to $C_7$ isomonoolefin and a para-alkylstyrene for use as a component of the present blends and tire sidewall compositions comprise at least 9.5 weight percent of the para-alkylstyrene moiety. For elastomeric copolymer products, the para-alkylstyrene moiety may range from about 9.5 weight percent to about 20 weight percent, preferably from about 12 to about 17 weight percent of the copolymer. The halogenated content of the copolymers may range from about 0.2 to about 1.0 mole percent, preferably from about 0.4 to about 0.8 mole percent. The halogen may be bromine, chlorine and mixtures thereof. Preferably, the halogen is bromine. The major portion of the halogen is chemically bound to the para-alkyl group, that is, the halogen-containing copolymer comprises para-haloalkyl groups.

The copolymers of the isomonoolefin and para-alkylstyrene useful to prepare the halogen-containing copolymers suitable as a component of the tire sidewall composition of the present invention include copolymers of isomonoolefin having from 4 to 7 carbon atoms and a para-alkylstyrene, such as those described in U.S. Pat. No. 5,162,445. The preferred isomonoolefin comprises isobutylene. The preferred para-alkylstyrene comprises para-methylstyrene. Other aromatic monomers and styrenics, for example, alkylstyrenes such as alpha-methylstyrene and meta-methylstyrene, may be employed in lieu of some of the para-alkylstyrene, provided the total aromatic content of the copolymer is in the rage of 9.5 to 20 weight percent, preferably 12 to 17 weight percent. Sufficient amounts of the para-alkylstyrene must, of course, be used to obtain the halogenated copolymer with the halogenated para-alkyl groups.

Preferably, the blend of the present invention contains quantities of bromoalkylstyrene and para-alkylstyrene which satisfy the following formula:

$X=[1.91-(0.094\times Y)]\pm 0.1$ where "X" is mole percent bromoalkylstyrene and "Y" is weight percent para-alkylstyrene (between the limits of 9.5 to 20 weight percent). "±0.1" as used herein indicates that the value X may be any number within the range of 0.1 above to 0.1 below [1.91−(0.094×Y)]. The bromoalkylstyrene is preferably para-bromomethylstyrene and the para-alkylstyrene is preferably para-methylstyrene. More preferably, the blend of the present invention has 0.96 mole percent para-bromomethylstyrene and 10 weight percent para-methylstyrene. Alternatively, the blend of the present invention preferably has 0.84 mole percent para-bromomethylstyrene and 12.5 weight percent para-methylstyrene.

Suitable copolymers of an isomonoolefin and a para-alkylstyrene include copolymers having a weight average molecular weight (Mw) of at least about 100,000, preferably at least about 300,000, and a number average molecular weight (Mn) of at least about 100,000. The copolymers also, preferably, have a ratio of weight to number average molecular weight, i.e., Mw/Mn of less than about 6 preferably less than about 4. The brominated copolymer of the isoolefin and para-alkylstyrene obtained by the polymerization of these particular monomers under certain specific polymerization conditions now permits one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof At least about 95 weight percent of the copolymer product has a para-alkylstyrene content within about 7 weight percent, of the average para-alkylstyrene content for the overall composition, and preferably at least about 97 weight percent of the copolymer product has a para-alkylstyrene content within about 7 weight percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers and in any particular polymer chain the para-alkylstyrene and isoolefin units will be essentially randomly distributed throughout the chain.

The halogen-containing copolymers useful in the practice of the present invention have a substantially homogenous compositional distribution and include the para-alkylstyrene moiety represented by the formula:

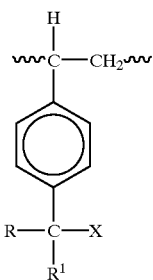

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in U.S. Pat. No. 5,162,445, the teachings of which are incorporated by reference.

Various methods may be used to produce the copolymers of isomonoolefin and para-alkylstyrene, as known in the art. Preferably, the polymerization is carried out continuously in a typical continuous polymerization process using a baffled tank-type reactor fitted with an efficient agitation means such as a turbo mixer or propeller, and draft tube, external cooling jacket and internal cooling coils or other means of removing the heat of polymerization, inlet pipes for monomers, catalyst and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in polymerization reaction to produce the desired para-alkylstyrene copolymers suitable for use in the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentrations of up to 40 weight percent of polymer are possible. However, a solution process is preferred for the higher levels of PMS.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, and methyl chloride, with methyl chloride being particularly preferred.

An important element in producing the copolymer is the exclusion of the impurities from the polymerization reactor, namely, impurities which if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisons, moisture and the like. These impurities should be kept out of the system.

In producing the suitable copolymers, it is preferred that the para-alkylstyrene be at least 95.0 weight percent pure, preferably 97.5 weight percent pure, most preferably 99.5 weight percent pure, that the isomonoolefin be at least 99.5 weight percent pure, preferably at least 99.8 weight percent pure, and that the diluents employed be at least 99 weight percent pure, and preferably at least 99.8 weight percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 weight percent and preferably from about 0.001 to 0.2 weight percent based upon the total amount of monomer to be polymerized.

Halogenation of the polymer can be carried out in the bulk phase (e.g. melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methylstyryl moiety in the useful copolymers for the practice of this invention can be made highly specific with almost exclusive substitution occurring on the para-methyl group, to yield the desired benzylic bromine functionality. The specificity of the bromination reaction can thus be maintained over a broad range of reaction conditions, provided, however, the factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature condition being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or crosslinking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or the solvents or polymer (i.e., via hydrogen abstraction), The sensitizers referred to are those photochemical sensitizers which will themselves absorb lower energy photons and disassociate, thus causing in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds such as azo bis isobutyronitrile (AIBN), azo bis(2,4-dimethylvalero)nitrile, azo bis(2-methylbutyro)nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as crosslinking. The radical bromination reaction of the copolymers of para-methylstyrene and isobutylene is highly selective, and almost exclusively produces the desired benzylic bromine functionality. Indeed, the only major side reaction which appears to occur in disubstitution at the para-methyl group to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content. Stated differently the para-methylstyrene content should preferably be at least twice the desired para-bromomethylstyrene content to avoid dibromination.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombinations and possible crosslinking. The reactions must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralizations and removal can be accomplished with a post-reaction caustic wash, generally using a molar excess of caustic on the HBr. Alternatively, neutralization can be accomplished by having a particulate base (which is relatively nonreactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., pentane, hexane or heptane) solution utilizing a bis azo initiator, e.g., AIBN or VAZO® 52: 2,2'-azobis(2,4-dimethyl-pentane nitrile), at about 55° to 80° C., for a time period ranging from about 4.5 to about 30 minutes, followed by a caustic quench. The halogen content is generally controlled by limiting the quantity of halogen reactant. The recovered polymer is washed in basic water and water/isopropanol washes, recovered, stabilized and dried.

The aromatic halomethyl groups permit facile crosslinking to be accomplished in a variety of ways, for example, either directly through the halomethyl group or by conversion to other functional groups, as indicated above, to permit the desired crosslinking reactions to be employed. Direct crosslinking can be effected with a variety of polyfunctional groups, as indicated above, to permit the desired crosslinking reactions to be employed. Direct crosslinking can be effected with a variety of polyfunctional nucleophilic reagents such as ammonia, amines, or polyamines; metal dicarboxylates; metal dithiolates; promoted metal oxides (e.g., ZnO+zinc stearates and/or dithiocarbamates), etc. Crosslinking can also be effected via polyalkylation reactions. The aromatic halomethyl groups thus provide a wide choice of crosslinking reactions which can be used.

Various fillers can also be used in single layer or the outer and/or inner layer blend compositions of the present invention, and these include a variety of carbon blacks, clays, silicas, carbonates, oils, resins, and waxes. Carbon blacks preferred for use in black tire sidewall compositions of this invention include those types designated N339, N774, N660, N351 and N375. Alternatively, non-black filers and pigments may be used for white tire sidewalls. The blends are cured with conventional curatives for highly unsaturated or chlorobutyl rubbers, including sulfur, alkylphenol disulfide, zinc oxide, sulfenamide derivatives, guanidines, benzothiazyldisulfide (MBTS) and mercaptobenzothiazole (MBT).

When constructing tires employing the sidewalls of the invention, the sidewalls can be made of the blend composition, or the present blend composition can be used as an outer layer or veneer over an inner layer. The thickness of the inner and outer layers will vary depending upon the type and size of the tires being built. Typically for a passenger car tire, the outer layer thickness may vary from about 0.8 mm to about 2.0 mm. The inner layer may vary from about 1.0 mm to about 2.0 mm. For example, a tire size 185/60-HR-14 would have a sidewall width of about 95 mm and an overall length of about 1210 mm.

The single-layer or multi-layered tire sidewall compositions of the present invention may be vulcanized by subjecting them to heat and/or light or radiation according to any vulcanization process.

The single-layer or multi-layered tire sidewall of the present invention may be used as the sidewall for motor vehicle tires such as truck tires, bus tires, passenger automobile, motorcycle tires and the like.

Suitable tire sidewall layer compositions may be prepared by using conventional mixing techniques including, e g., kneading, roller milling, extruder mixing, internal mixing (such as with a Banbury® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the rubber components, fillers, and plasticizer are added and the composition mixed for the desired time to a particular temperature to achieve adequate dispersion of the ingredients. Alternatively, the rubbers and a portion of the fillers (e.g., one-third to two-thirds) is mixed for a short time (e.g. about 1 to 3 minutes)

followed by the remainder of the fillers and oil. Mixing is continued for about 5 to 10 minutes at high rotor speed during which time the mixed components reach a temperature of about 150° C. Following cooling, the components are mixed in a second step on a rubber mill or in a Banbury mixer during which the curing agent and optional accelerator, are thoroughly and uniformly dispersed at a relatively low temperature, e.g., about 80° to about 105° C. Variations in mixing will be readily apparent to those skilled in the art and the present invention is not limited to any specific mixing procedure. The mixing is performed to disperse all components of the composition thoroughly and uniformly.

Tires are generally built on a drum from at least three layers, namely, an outer layer comprising a tread portion and sidewalls comprising the inner and outer layers of this invention, an intermediate layer, and an innerliner. After the uncured tire has been built on a building drum, the uncured tire may be placed in a heated mold to shape it and heat it to vulcanization temperatures and, thereby, to produce a cured unitary tire from the multi-layers.

Vulcanization of the molded tire, typically, is carried out in heated presses under conditions well known to those skilled in the art.

Curing time will be affected by the thickness of the tire to be molded and the concentration and type of curing agent as well as the halogen content of the halogenated copolymer. However, the vulcanization parameters can readily be established with a few experiments utilizing, e.g., a laboratory characterization device well known in the art, the Monsanto Oscillating Disc Cure Rheometer (ODR, described in detail in American Society for Testing and Materials, Standard ASTM D 2084)

Tires produced according to the present invention offer black or white sidewall tire with the features of improved adhesion and ozone resistance as well as good curing and flex crack resistance. In the present tire, by using the halogenated copolymer in the tire sidewall, or in only the outer layer, good ozone resistance is achieved. In addition, the outer layer acts as a barrier preventing migration of additives in protectants from the inner layer to the outside, thus eliminating the staining and discoloring problem discussed above.

The following examples are presented to illustrate the invention. All parts and percentages herein are by weight unless otherwise specified.

EXAMPLE 1

Master batches of brominated isobutylene/para-methylstyrene copolymers of varying bromination level, comonomer content and molecular weight were prepared. The copolymers had the properties listed in Table 1.

TABLE 1

| | COPOLYMER | | | | | |
| --- | --- | --- | --- | --- | --- | --- |
| PROPERTY | EXXPRO 89-1 | EXXPRO 93-4 | EXXPRO 96-3 | A | B | C |
| Para-Methylstyrene (wt %) | 5.0 | 7.5 | 7.5 | 9.5 | 13.6 | 13.6 |
| Bromomethylstyrene (mol %) | 0.75 | 1.2 | 0.75 | 1.0 | 1.0 | 0.8 |
| Mooney Viscosity (ML(1 + 8)125° C.) | 35 ± 5 | 38 ± 5 | 40 ± 5 | 35 ± 5 | 38 ± 5 | 44 ± 5 |

Test compositions were compounded using 3-pass mixing conditions to blend the master batch components and the cure additives listed in Table 2. The compositions were cured at 150° C. (18 minutes for tensile and fatigue testing; 21 minutes for Demattia and outdoor flex testing and 175° C. (11 minutes for tensile and fatigue testing; 14 minutes for Demattia and outdoor flex testing).

TABLE 2

| RECIPES | 1A | 1B | 1C | 1D | 1E | 1F | 1G | 1H |
| --- | --- | --- | --- | --- | --- | --- | --- | --- |
| Master Batch (phr) | | | | | | | | |
| EXXPRO 89-1 | 40 | | | | | | | |
| EXXPRO 93-4 | | 40 | | | | | | |
| EXXPRO 96-3 | | | 40 | | | | | |
| Copolymer 1A | | | | 40 | | | 40 | |
| Copolymer 1B | | | | | 40 | | | 40 |
| Copolymer 1C | | | | | | 40 | | |
| BUDENE 1207 | 50 | 50 | 50 | 50 | 50 | 50 | 50 | 50 |
| SMR20 | 10 | 10 | 10 | 10 | 10 | 10 | 10 | 10 |
| Black N660 | 40 | 40 | 40 | 40 | 40 | 40 | 40 | 40 |
| FLEXON 641 | 12 | 12 | 12 | 12 | 12 | 12 | 12 | 12 |
| ESCOREZ 1102 | 5 | 5 | 5 | 5 | 5 | 5 | 5 | 5 |
| STRUCKOL 40MS | 4 | 4 | 4 | 4 | 4 | 4 | 4 | 4 |
| SP 1068 | 2 | 2 | 2 | 2 | 2 | 2 | 2 | 2 |

TABLE 2-continued

| RECIPES | 1A | 1B | 1C | 1D | 1E | 1F | 1G | 1H |
|---|---|---|---|---|---|---|---|---|
| Cure Package (phr) | | | | | | | | |
| Sulfur | 0.40 | 0.40 | 0.40 | 0.40 | 0.40 | 0.40 | 0.80 | 0.80 |
| Zinc Oxide | 0.75 | 0.75 | 0.75 | 0.75 | 0.75 | 0.75 | 2.00 | 2.00 |
| RYLEX 3011 | 0.60 | 0.60 | 0.60 | 0.60 | 0.60 | 0.60 | | |
| Stearic Acid | 0.50 | 0.50 | 0.50 | 0.50 | 0.50 | 0.50 | | |
| MBTS | 0.80 | 0.80 | 0.80 | 0.80 | 0.80 | 0.80 | | |
| TBBS | | | | | | | 1.60 | 1.60 |
| DURALINK HTS | | | | | | | 2.00 | 2.00 |
| SANTOVAR TAHQ | | | | | | | 1.50 | 1.50 |
| TOTAL PHR | 166.05 | 166.05 | 166.05 | 166.05 | 166.05 | 166.05 | 170.9 | 170.9 |

The test compositions (1A through 1H) were tested for cure characteristics, tensile strength, flex fatigue, adhesion and ozone resistance. The results are presented in Table 3 below. The following descriptors are used herein to refer to cracking types and ratings:

| Descriptor | Meaning |
|---|---|
| Excel | No cracking |
| Good | Edge cracking only |
| Fair | Minor or Major cracking |
| Poor | Deep cracking, tear or separation |

-continued

| Descriptor | Meaning |
|---|---|
| 0 | No cracking |
| 1 | Minor cracking |
| 2 | Major cracking |
| 3 | Deep Cracking |
| 4 | Tearing |
| 5 | Separated |
| 6 | Edge crack |

TABLE 3

| RECIPES | 1A | 1B | 1C | 1D | 1E | 1F | 1G | 1H |
|---|---|---|---|---|---|---|---|---|
| Mooney Scorch @ 135° C. | | | | | | | | |
| 1 MU, min | 7.5 | 6.3 | 8.0 | 8.6 | 8.4 | 8.3 | 1.8 | 5.9 |
| 2 MU, min | 8.8 | 7.2 | 9.3 | 10.0 | 9.0 | 9.5 | 4.2 | 7.1 |
| 5 MU, min | 11. | 8.7 | 11.4 | 12.1 | 12.0 | 11.5 | 9.1 | 9.1 |
| 10 MU min | 13.5 | 10.4 | 13.8 | 14.1 | 14.0 | 13.6 | 11.7 | 10.3 |
| 20 MU, min | 16.7 | 12.8 | 16.0 | 16.6 | 17.0 | 16.6 | 14.2 | 11.2 |
| ODR @ 150° C., 1° Arc, 30 Min | | | | | | | | |
| ML, dNm | 3.6 | 4.1 | 3.9 | 4.6 | 3.7 | 3.8 | 4.8 | 4.0 |
| MH, dNm | 14.3 | 18.1 | 15.1 | 19.6 | 16.0 | 14.1 | 18.3 | 19.2 |
| ts2, min | 7.6 | 5.8 | 7.7 | 6.8 | 7.7 | 8.1 | 7.4 | 5.7 |
| t25, min | 8.8 | 7.4 | 9.2 | 8.8 | 9.3 | 9.1 | 8.7 | 6.6 |
| t50, min | 13.5 | 10.7 | 14.1 | 13.1 | 13.5 | 13.6 | 12.3 | 9.1 |
| t90, min | 22.7 | 17.7 | 23.4 | 21.8 | 21.7 | 22.5 | 23.6 | 17.7 |
| Peak Rate, dNm,/min | 1.5 | 1.4 | 0.8 | 1.1 | 1.0 | 0.9 | 1.2 | 2.1 |
| Curve Type | SLM | P | SLM | SLM | SLM | P | M | P |
| ODR @ 175° C., 1° Arc, 30 min | | | | | | | | |
| ML, dNm | 4.0 | 4.1 | 4.2 | 4.0 | 3.8 | 4.1 | 4.0 | 4.1 |
| MH, dNm | 21.0 | 23.7 | 21.5 | 22.1 | 20.9 | 19.6 | 20.2 | 24.7 |
| ts2, min | 2.5 | 2.2 | 2.5 | 2.5 | 2.5 | 2.8 | 2.5 | 2.1 |
| t25, min | 3.1 | 2.8 | 3.2 | 3.2 | 3.1 | 3.4 | 2.9 | 2.5 |
| t50, min | 4.2 | 3.6 | 4.3 | 4.1 | 4.0 | 4.4 | 3.9 | 3.1 |
| t90, min | 7.8 | 8.7 | 7.8 | 7.2 | 6.8 | 8.1 | 9.0 | 6.3 |
| Peak Rate, dNm/min | 4.5 | 7.0 | 4.5 | 5.2 | 5.3 | 4.0 | 5.0 | 9.4 |
| Curve Type | P | P | P | P | P | P | P | SLR |
| Stress-Strain, Unaged, Tested @ RT, Cured @ 150° C. | | | | | | | | |
| Stress @ break (MPa) | 12.3 | 10.1 | 12.2 | 11.5 | 13.4 | 11.0 | 10.5 | 13.3 |
| Stress @ 100% (MPa) | 0.9 | 1.2 | 0.9 | 1.0 | 0.9 | 0.9 | 0.8 | 1.2 |
| Stress @ 200% (MPa) | 1.8 | 2.6 | 1.7 | 2.0 | 1.9 | 1.6 | 1.7 | 2.3 |
| Stress @ 300% (MPa) | 1.7 | 1.8 | 2.0 | 1.9 | 1.6 | 2.7 | 2.3 | 2.6 |

TABLE 3-continued

| RECIPES | 1A | 1B | 1C | 1D | 1E | 1F | 1G | 1H |
|---|---|---|---|---|---|---|---|---|
| % Elongation @ break | 776 | 603 | 831 | 752 | 789 | 808 | 799 | 752 |
| Shore A @ 4 sec | 38.1 | 41.5 | 38.9 | 40.5 | 39.3 | 37.7 | 36.3 | 43.1 |
| Stress-Strain, Unaged, Tested @ RT, Cured @ 175° C. | | | | | | | | |
| Stress @ break (MPa) | 13.1 | 11.9 | 13.1 | 14.0 | 12.8 | 12.8 | 12.9 | 10.2 |
| Stress @ 100% (MPa) | 1.1 | 1.4 | 1.1 | 1.2 | 1.0 | 1.0 | 0.9 | 1.3 |
| Stress @ 200% (MPa) | 2.1 | 3.0 | 2.1 | 2.6 | 2.1 | 2.0 | 1.8 | 6.2 |
| Stress @ 300% (MPa) | 3.6 | 5.0 | 3.6 | 4.2 | 3.6 | 3.3 | 3.0 | 4.2 |
| % Elongation @ break | 765 | 616 | 817 | 711 | 780 | 790 | 834 | 643 |
| Shore A @ 4 sec | 40.9 | 43.5 | 41.5 | 42.7 | 41.5 | 40.5 | 39.1 | 43.3 |
| Pierced Demattia Flex, 300 Cycles/min. 60° bend. Unaged, Cured @ 175° C. for 14 min | | | | | | | | |
| Cycles | mm | mm | mm | mm | mm | mm | mm | mm |
| 0 | 2.0 | 2.0 | 2.0 | 2.0 | 2.0 | 2.0 | 2.0 | 2.0 |
| 4,500 | 3.1 | 3.5 | 3.3 | 3.4 | 3.3 | 3.3 | 3.2 | 5.3 |
| 9,000 | 3.6 | 4.4 | 3.4 | 3.6 | 3.5 | 3.8 | 3.6 | 8.0 |
| 13,500 | 3.9 | 4.7 | 4.0 | 4.2 | 5.1 | 3.9 | 4.1 | 9.6 |
| 18,000 | 4.2 | 5.0 | 4.1 | 4.4 | 5.6 | 4.5 | 4.2 | 10.5 |
| 36,000 | 5.1 | 6.4 | 4.8 | 5.0 | 7.5 | 5.6 | 4.8 | 14.0 |
| 54,000 | 6.2 | 8.3 | 5.2 | 5.5 | 8.4 | 6.5 | 5.4 | 16.0 |
| 72,000 | 6.4 | 7.8 | 6.0 | 5.7 | 8.7 | 7.1 | 5.9 | 18.1 |
| 90,000 | 7.4 | 8.2 | 6.4 | 6.1 | 10.0 | 7.4 | 6.2 | 19.8 |
| 378,000 | 11.0 | 8.4 | 7.8 | 7.0 | 13.0 | 11.8 | 7.6 | 25.0 |
| 810,000 | 11.1 | 8.5 | 8.0 | 8.8 | 14.0 | 12.4 | 9.0 | 25.0 |
| 1,242,000 | 11.1 | 8.5 | 8.2 | 9.0 | 14.6 | 12.9 | 10.0 | 25.0 |
| 1,674,000 | 12.7 | 8.5 | 8.2 | 10.7 | 15.1 | 13.0 | 9.8 | 25.0 |
| 2,200,000 | 12.8 | 8.7 | 8.2 | 10.7 | 15.1 | 13.0 | 10.4 | 25.0 |
| Pierced Demattia Flex, 300 Cycles/min, 60° bend, Aged 70 Days, Cured @ 175° C. for 14 min | | | | | | | | |
| Cycles | mm | mm | mm | mm | mm | mm | mm | mm |
| 0 | 2.0 | 2.0 | 2.0 | 2.0 | 2.0 | 2.0 | 2.0 | 2.0 |
| 4,500 | 6.7 | 10.2 | 8.3 | 6.6 | 5.5 | 5.1 | 8.6 | 25.0 |
| 9,000 | 8.9 | 13.2 | 10.0 | 7.2 | 6.5 | 6.4 | 10.9 | 25.0 |
| 13,500 | 10.1 | 15.6 | 12.0 | 8.9 | 7.3 | 7.1 | 13.7 | 25.0 |
| 18,000 | 11.4 | 18.1 | 12.6 | 9.6 | 7.4 | 7.5 | 14.5 | 25.0 |
| 36,000 | 14.0 | 23.4 | 15.4 | 11.0 | 7.6 | 9.4 | 18.7 | 25.0 |
| 54,000 | 14.0 | 25.0 | 17.9 | 12.0 | 7.9 | 9.6 | 23.1 | 25.0 |
| 72,000 | 16.1 | 25.0 | 19.3 | 12.3 | 8.1 | 10.0 | 23.8 | 25.0 |
| 90,000 | 16.2 | 25.0 | 20.5 | 12.7 | 8.2 | 10.1 | 24.4 | 25.0 |
| 378,000 | 20.1 | 25.0 | 22.9 | 15.1 | 13.2 | 10.3 | 25.0 | 25.0 |
| 810,000 | 20.7 | 25.0 | 23.8 | 16.3 | 13.5 | 10.8 | 25.0 | 25.0 |
| 1,242,000 | 20.9 | 25.0 | 24.4 | 17.2 | 13.6 | 11.7 | 25.0 | 25.0 |
| 1,674,000 | 21.0 | 25.0 | 24.4 | 18.1 | 14.5 | 11.8 | 25.0 | 25.0 |
| 2,200,000 | 21.0 | 25.0 | 24.4 | 21.5 | 17.9 | 11.8 | 25.0 | 25.0 |
| Fatigue-to-Failure, 101% Elong., 100 Cycles/min, Unaged, Tested @ RT, Cured @ 175° C. for 14 min | | | | | | | | |
| 1 | 299469 | 474437 | 423700 | 568681 | 851035 | 249825 | 250295 | 503018 |
| 2 | 55249 | 323169 | 295957 | 489560 | 646772 | 206753 | 395717 | 495203 |
| 3 | 229232 | 272149 | 235538 | 524730 | 455105 | 262721 | 543253 | 608057 |
| 4 | 246140 | 378201 | 271244 | 662392 | 555320 | 213633 | 500604 | 671023 |
| 5 | 385646 | 358162 | 371391 | 576613 | 808128 | 253651 | 436442 | 591463 |
| 6 | 401886 | 434800 | 368917 | 727805 | 843489 | 255568 | 430599 | 596135 |
| 7 | 285398 | 471884 | 290089 | 834011 | 896678 | 368895 | 458971 | 605052 |
| 8 | 292774 | 417911 | 394821 | 848445 | 1E+06 | 273305 | 529245 | 814932 |
| Mean, cycles | 274474 | 391339 | 331457 | 654030 | 757741 | 260544 | 443141 | 610610 |
| Rounded Off (× 1000) | 275 | 391 | 332 | 654 | 758 | 261 | 443 | 611 |
| Fatigue to Failure, 101% Elong., 100 Cycles/min, Aged 70 Days @ 70° C., Tested @ RT, Cured @ 175° C. for 14 min | | | | | | | | |
| 1 | 514957 | 119872 | 77077 | 21566 | 12457 | 304584 | 193522 | 48003 |
| 2 | 632240 | 272194 | 619631 | 516511 | 187557 | 338433 | 251824 | 13264 |
| 3 | 459893 | 134145 | 295085 | 459893 | 404585 | 368364 | 296195 | 32935 |
| 4 | 556415 | 308092 | 677578 | 790353 | 623963 | 341525 | 293385 | 64726 |
| 5 | 663633 | 371743 | 496268 | 624169 | 791603 | 545887 | 398263 | 39982 |
| 6 | 590643 | 359202 | 375256 | 433444 | 721574 | 564278 | 527785 | 74095 |
| 7 | 402796 | 367100 | 681192 | 686172 | 915044 | 367767 | 503897 | 6491 |
| 8 | 570675 | 311924 | 510982 | 774470 | 1E+06 | 688728 | 605345 | 9490 |
| Mean, cycles | 548907 | 280534 | 466634 | 538322 | 584184 | 439946 | 383777 | 36123 |

TABLE 3-continued

| RECIPES | 1A | 1B | 1C | 1D | 1E | 1F | 1G | 1H |
|---|---|---|---|---|---|---|---|---|
| Rounded Off (× 1000) | 549 | 281 | 467 | 538 | 584 | 440 | 384 | 36 |
| Fatigue to Failure, 101% Elong., 100 Cycles/min. Unaged, Tested @ RT, Cured @ 150° C. for 21 min | | | | | | | | |
| 1 | 253958 | 183000 | >1M | >1M | >1M | 148815 | 204163 | 209386 |
| 2 | 227774 | 224530 | >1M | >1M | >1M | 237701 | 241507 | 258459 |
| 3 | 293006 | 173431 | >1M | >1M | >1M | 417194 | 186062 | 252981 |
| 4 | 401986 | 196761 | >1M | >1M | >1M | 355230 | 223373 | 184522 |
| 5 | 372749 | 173965 | >1M | >1M | >1M | 373614 | 231736 | 329088 |
| 6 | 362091 | 172382 | >1M | >1M | >1M | 390818 | 331287 | 336883 |
| 7 | 651507 | 282682 | >1M | >1M | >1M | 376861 | 335870 | 223471 |
| 8 | 494900 | 876872 | >1M | >1M | >1M | 350848 | 362558 | 203840 |
| Mean, cycles | 382246 | 219578 | >1M | >1M | >1M | 331385 | 367070 | 249829 |
| Rounded Off (× 1000) | 382 | 220 | >1M | >1M | >1M | 331 | 267 | 250 |
| 1" Strip Adhesion to "Carcass" Tested @ 100° C., Cured @ 150° C. for 21 min | | | | | | | | |
| Avg. Peak (lb) | 146 | 114 | 170 | 148 | 146 | 84 | 128 | 55 |
| Avg. Peel (lb) | 117 | 93 | 149 | 124 | 118 | 66 | 108 | 46 |
| Surface Appearance | P/P | P/P | P/P | P/P | P/P | SP/SP | P/P | P/P |
| 1" Strip Adhesion to "Self" Tested @ 100° C., Cured @ 150° C. for 21 min | | | | | | | | |
| Avg. Peak (lb) | 162 | 136 | 177 | 164 | 164 | 149 | 145 | 68 |
| Avg. Peel (lb) | 149 | 115 | 168 | 151 | 150 | 142 | 125 | 57 |
| Surface Appearance | P-T/P-T | P/P | P-T/P-T | PT/PT | P-T/P-T | P-T/P-T | P/P | P/P |
| 1" Strip Adhesion to "Carcass", Tested @ 100° C., Cured @ 175° C. for 14 min | | | | | | | | |
| Avg. Peak (lb) | 120 | 93 | 138 | 121 | 139 | 113 | 95 | 50 |
| Avg. Peel (lb) | 110 | 76 | 115 | 100 | 110 | 80 | 81 | 44 |
| Surface Appearance | P/P | P/P | P/P | P/P | P/P | SP/SP | P/P | SP/SP |
| 1" Strip Adhesion to "Self" Tested @ 100° C., Cured @ 175° C. for 14 min | | | | | | | | |
| Avg. Peak (lb) | 136 | 108 | 153 | 153 | 163 | 141 | 129 | 67 |
| Avg. Peak (lb) | 122 | 86 | 129 | 123 | 135 | 116 | 107 | 56 |
| Surface Appearance | P-T/P-T | P/P | P/P | P/P | P/P | P/P | P/P | P/P |
| Ozone Static - Bent Loop @ 40° C. & 25 pphm of O3, Unaged, Cured @ 150° C. for 21 min | | | | | | | | |
| Crack 1, days/Type of Crack | 0 | 0 | 0 | 0 | 0 | 0 | 0 | 0 |
| Crack 2, days/Type of Crack | | | | | | | | |
| Crack 3, days/Type of Crack | | | | | | | | |
| Crack 4, days/Type of Crack | | | | | | | | |
| Test Duration, Days | 22 | 22 | 22 | 22 | 22 | 22 | 22 | 22 |
| Rating | Excel | Excel | Excel | Excel | Excel | Excel | Excel | Excel |
| Ozone Static - Bent Loop @ 40° C. & 25 pphm of O3, Aged 70 Days @ 70° C. Cured @ 150° C. for 21 min | | | | | | | | |
| Crack 1, days/Type of Crack | 0 | 0 | 0 | 0 | 0 | 0 | 24/1 | 24/1 |
| Crack 2, days/Type of Crack | | | | | | | | |
| Crack 3, days/Type of Crack | | | | | | | | |
| Crack 4, days/Type of Crack | | | | | | | | |
| Test Duration, Days | 28 | 28 | 28 | 28 | 28 | 28 | 28 | 28 |
| Ratings | Excel | Excel | Excel | Excel | Excel | Excel | Fair | Fair |
| Ozone Static - Bent Loop @ 40° C. & 25 pphm of O3, Unaged, Cured @ 175° C. for 14 min | | | | | | | | |
| Crack 1, days/Type of Crack | 0 | 0 | 0 | 0 | 0 | 0 | 7/1 | 6/2 |
| Crack 2, days/Type of Crack | | | | 0 | | | 12/4 | 12/3 |
| Crack 3, days/Type of Crack | | | | | | | | 13/4 |
| Crack 4, days/Type of Crack | | | | | | | | |
| Test Duration, Days | 22 | 22 | 22 | 22 | 22 | 22 | 22 | 22 |
| Ratings | Excel | Excel | Excel | Excel | Excel | Excel | Poor | Poor |

TABLE 3-continued

| RECIPES | 1A | 1B | 1C | 1D | 1E | 1F | 1G | 1H |
|---|---|---|---|---|---|---|---|---|
| Ozone Static - Bent Loop @ 40° C. & 25 pphm of O3, Aged 70 Days @ 70° C., Cured @ 175° C. for 14 min | | | | | | | | |
| Crack 1, days/Type of Crack | 0 | 0 | 0 | 0 | 0 | 0 | 0 | 0 |
| Crack 2, days/Type of Crack | | | | | | | | |
| Crack 3, days/Type of Crack | | | | | | | | |
| Crack 4, days/Type of Crack | | | | | | | | |
| Test Duration/Days | 28 | 28 | 28 | 28 | 28 | 28 | 28 | 28 |
| Ratings | Excel | Excel | Excel | Excel | Excel | Excel | Excel | Excel |
| Ozone Dynamic - Tensile @ 40° C. & 25 pphm of O3, Unaged, Cured @ 150° C. for 21 min | | | | | | | | |
| Crack 1, days/Type of Crack | 0 | 0 | 0 | 0 | 0 | 0 | 14/1 | 6/5 |
| Crack 2, days/Type of Crack | | | | | | | 17/4 | |
| Crack 3, days/Type of Crack | | | | | | | 21/5 | |
| Crack 4, days/Type of Crack | | | | | | | | |
| Teat Duration/Days | 22 | 22 | 22 | 22 | 22 | 22 | 22 | 22 |
| Ratings | Excel | Excel | Excel | Excel | Excel | Excel | Poor | Poor |
| Ozone Dynamic - Tensile @ 40° C. & 25 pphm of O3, Aged for 70 Days @ 70° C., Cured @ 150° C. for 21 min | | | | | | | | |
| Crack 1, days/Type of Crack | 0 | 15/5 | 0 | 0 | 15/5 | 0 | 18/2 | 15/4 |
| Crack 2, days/Type of Crack | | | | | | | 21/4 | 18/5 |
| Crack 3, days/Type of Crack | | | | | | | 28/5 | |
| Crack 4, days/Type of Crack | | | | | | | | |
| Test Duration/Days | 28 | 28 | 28 | 28 | 28 | 28 | 28 | 28 |
| Ratings | Excel | Poor | Excel | Excel | Excel | Excel | Poor | Poor |
| Ozone Dynamic - Tensile @ 40° C. & 25 pphm of O3, Unaged, Cured @ 175° C. for 14 min | | | | | | | | |
| Crack 1, days/Type of Crack | 0 | 0 | 12/4 | 0 | 0 | 0 | 6/1 | 6/2 |
| Crack 2, days/Type of Crack | | | 14/5 | | | | 12/5 | 7/3 |
| Crack 3, days/Type of Crack | | | | | | | | 8/5 |
| Crack 4, days/Type of Crack | | | | | | | | |
| Teat Duration/Days | 22 | 22 | 22 | 22 | 22 | 22 | 22 | 22 |
| Ratings | Excel | Excel | Poor | Excel | Excel | Excel | Poor | Poor |
| Ozone Dynamic - Tensile @ 40° C. & 25 pphm of O3, Aged for 70 Days @ 70° C., Cured @ 175° C. for 14 min | | | | | | | | |
| Crack 1, days/Type of Crack | 0 | 0 | 0 | 0 | 0 | 0 | 0 | 21/5 |
| Crack 2, days/Type of Crack | | | | | | | | |
| Crack 3, days/Type of Crack | | | | | | | | |
| Crack 4, days/Type of Crack | | | | | | | | |
| Test Duration/Days | 28 | 28 | 28 | 28 | 28 | 28 | 28 | 28 |
| Ratings | Excel | Excel | Excel | Excel | Excel | Excel | Excel | Excel |
| Outdoor Flex, Unaged, Cured @ 150° C. for 21 min. | | | | | | | | |
| Crack 1, days/Type of Crack | 18/6 | 0 | 18/6 | 0 | 0 | 0 | 8/1 | 5/1 |
| Crack 2, days/Type of Crack | | | | | | | 21/2 | 14/2 |
| Crack 3, days/Type of Crack | | | | | | | | 21/3 |
| Crack 4, days/Type of Crack | | | | | | | | |
| Test Duration/Days | 26 | 26 | 26 | 26 | 26 | 26 | 26 | 26 |
| Ratings | Good | Excel | Good | Excel | Excel | Excel | Fair | Poor |
| Outdoor Flex, Aged 70 Days @ 70° C., Cured @ 150° C. for 21 min | | | | | | | | |
| Crack 1, days/Type of Crack | 14/6 | 14/6 | 21/6 | 15/6 | 1/4 | 0 | 6/6 | 24/6 |
| Crack 2, days/Type of Crack | 27/1/6 | | 24/1/6 | | | | 9/4/6 | 30/1/6 |
| Crack 3, days/Type of Crack | | | | | | | | |
| Crack 4, days/Type of Crack | | | | | | | | |
| Test Duration/Days | 37 | 37 | 37 | 37 | 37 | 37 | 37 | 37 |
| Rating | Fair | Good | Fair | Good | Poor | Excel | Poor | Fair |
| | | | | | GPR - Minor Cracking @ 29 Days | | | |
| Outdoor Flex, Unaged, Cured @ 175° C. for 14 min | | | | | | | | |
| Crack 1, days/Type of Crack | 8/1 | 19/6 | 8/1 | 0 | 0 | 19/6 | 8/1 | 3/1 |
| Crack 2, days/Type of Crack | 12/1/6 | | 18/2/6 | | | 20/1/6 | 18/1/6 | 19/1/6 |

TABLE 3-continued

| RECIPES | 1A | 1B | 1C | 1D | 1E | 1F | 1G | 1H |
|---|---|---|---|---|---|---|---|---|
| Crack 3, days/Type of Crack | 18/2/6 | | 23/3/6 | | | | 21/2/6 | 23/1/6 |
| Crack 4, days/Type of Crack | 23/3/6 | | | | | | | |
| Test Duration/Days | 26 | 26 | 26 | 26 | 26 | 26 | 26 | 26 |
| Rating | Poor | Good | Poor | Excel | Excel | Good | Fair | Good |
| Outdoor Flex, Aged 70 Days @ 70° C., Cured @ 175° C. for 14 min | | | | | | | | |
| Crack 1, days/Type of Crack | 24/1/6 | 27/6 | 21/6 | 27/1/6 | 0 | 27/6 | 27/1 | 15/6/2 |
| Crack 1, days/Type of Crack | | | 24/1/6 | | | | 30/2 | 21/4/6 |
| Crack 1, days/Type of Crack | | | | | | | 37/2/6 | 33/5 |
| Crack 1, days/Type of Crack | | | | | | | | |
| Test Duration/Days | 37 | 37 | 37 | 37 | 37 | 37 | 37 | 37 |
| Rating | Fair | Good | Fair | Fair | Excel | Good | Fair | Poor |

Blends 1D through 1H exhibited similar cure characteristics to blends 1A, 1B and 1C and similar tensile properties. Blends 1D and 1F had better fatigue-to-failure and flex crack propagation resistance, and comparable ozone resistance.

EXAMPLE 2

Blends of rubber with a high-bromine, low para-methylstyrene copolymer and a low-bromine, high para-methylstyrene copolymer were prepared at varying ratios. The high-bromine, low para-methylstyrene copolymer was EXXPRO 93-4 copolymer comprised of 7.5 weight percent para-methylstyrene and 1.2 mole percent benzylic bromine. It had a Mooney viscosity ML (1+8) at 125° C. of 38±5. The low-bromine, high para-methylstyrene copolymer (Copolymer 2) was comprised of 13.6 weight percent para-methylstyrene and 0.56 mole percent benzylic bromine (0.78 weight percent bromine). It has a Mooney viscosity ML (1+8) at 125° C. of 37±5. The blends were compounded as described in Example 1 and cured at 180° C. for 15 minutes. The blends had the compositions of Table 4.

TABLE 4

| RECIPES | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Master Batch | | | | | | | | | | | | | | |
| EXXPRO 93-4 | 35 | 40 | 45 | 50 | 55 | 60 | 65 | | | | | | | |
| Copolymer 2 | | | | | | | | 35 | 40 | 45 | 50 | 55 | 60 | 65 |
| BUDENE 1207 | 54.17 | 50 | 45.83 | 41.67 | 37.5 | 33.33 | 29.17 | 54.17 | 50 | 45.83 | 41.67 | 37.5 | 33.33 | 29.17 |
| SMR 20 | 10.83 | 10 | 9.17 | 8.33 | 7.5 | 6.67 | 5.83 | 10.83 | 10 | 9.17 | 8.33 | 7.5 | 6.67 | 5.83 |
| N351 | 40 | 40 | 40 | 40 | 40 | 40 | 40 | 40 | 40 | 40 | 40 | 40 | 40 | 40 |
| FLEXON 641 | 12 | 12 | 12 | 12 | 12 | 12 | 12 | 12 | 12 | 12 | 12 | 12 | 12 | 12 |
| STRUCKTOL 40MS | 4 | 4 | 4 | 4 | 4 | 4 | 4 | 4 | 4 | 4 | 4 | 4 | 4 | 4 |
| ESCOREZ 1102 | 5 | 5 | 5 | 5 | 5 | 5 | 5 | 5 | 5 | 5 | 5 | 5 | 5 | 5 |
| SP 1068 | 2 | 2 | 2 | 2 | 2 | 2 | 2 | 2 | 2 | 2 | 2 | 2 | 2 | 2 |
| Cure Package | | | | | | | | | | | | | | |
| Stearic Acid | 0.5 | 0.5 | 0.5 | 0.5 | 0.5 | 0.5 | 0.5 | 0.5 | 0.5 | 0.5 | 0.5 | 0.5 | 0.5 | 0.5 |
| Sulfur | 0.4 | 0.4 | 0.4 | 0.4 | 0.4 | 0.4 | 0.4 | 0.4 | 0.4 | 0.4 | 0.4 | 0.4 | 0.4 | 0.4 |
| Zinc Oxide | 0.75 | 0.75 | 0.75 | 0.75 | 0.75 | 0.75 | 0.75 | 0.75 | 0.75 | 0.75 | 0.75 | 0.75 | 0.75 | 0.75 |
| RYLEX 3011 | 0.6 | 0.6 | 0.6 | 0.6 | 0.6 | 0.6 | 0.6 | 0.6 | 0.6 | 0.6 | 0.6 | 0.6 | 0.6 | 0.6 |
| MBTS | 0.8 | 0.8 | 0.8 | 0.8 | 0.8 | 0.8 | 0.8 | 0.8 | 0.8 | 0.8 | 0.8 | 0.8 | 0.8 | 0.8 |
| TOTAL PHR | 166.05 | 166.05 | 166.05 | 166.05 | 166.05 | 166.05 | 166.05 | 166.05 | 166.05 | 166.05 | 166.05 | 166.05 | 166.05 | 166.05 |

The blends were evaluated for cure characteristics, tensile and hardness properties, flex crack propagation resistance, tensile fatigue-to-failure, static and dynamic ozone resistance, and outdoor flex resistance. The results are presented in Table 5 using the same descriptor meanings as in Table 3.

TABLE 5

| RECIPES | 2A | 2B | 2C | 2D | 2E | 2F | 2G | 2H | 2I | 2J | 2K | 2L | 2M | 2N |
|---|---|---|---|---|---|---|---|---|---|---|---|---|---|---|
| Mooney Viscosity @ 100° C. | | | | | | | | | | | | | | |
| ML1 + 4 min (MU) | | 45.6 | 42.9 | 44.7 | 43.5 | 43.7 | 44.6 | 45.0 | 44.9 | 43.7 | 44.2 | 43.5 | 44.4 | 44.4 |
| ML1 + 8 min (MU) | 42.4 | 43.6 | 41.2 | 43.4 | 42.2 | 42.1 | 43.2 | 43.4 | 43.5 | 42.3 | 42.6 | 42.0 | 42.9 | 43.2 |
| Mooney Scorch @ 135° C. | | | | | | | | | | | | | | |
| 5 MU, MIN | 12.8 | 12.2 | 12.2 | 12 | 12.4 | 12.8 | 12.3 | 16 | 15.5 | 15.1 | 15.1 | 15.4 | 14.5 | 14.2 |
| 10 MU, min | 14.7 | 13.8 | 13.8 | 13.5 | 13.8 | 14.2 | 13.7 | 18.9 | 18.3 | 17.7 | 17.6 | 17.8 | 16.6 | 16.3 |
| MDR @ 160° C., .5° Arc, 60 min | | | | | | | | | | | | | | |
| ML, dNm | 1.35 | 1.37 | 1.32 | 1.37 | 1.32 | 1.27 | 1.27 | 1.46 | 1.44 | 1.39 | 1.38 | 1.34 | 1.37 | 1.38 |
| MH, dNm | 8.67 | 9.03 | 9.27 | 10.08 | 10.21 | 10.33 | 10.74 | 7.89 | 7.73 | 7.7 | 7.44 | 7.22 | 7.33 | 7.29 |
| Max-Min, dNm | 7.32 | 7.66 | 7.94 | 8.71 | 8.88 | 9.06 | 9.46 | 6.36 | 6.29 | 6.28 | 6.06 | 5.87 | 5.95 | 5.90 |
| ts2, min | 4.92 | 4.55 | 4.51 | 4.34 | 4.29 | 4.31 | 4.22 | 5.34 | 5.20 | 5.16 | 5.19 | 5.06 | 4.99 | 4.92 |
| t25, min | 4.72 | 4.46 | 4.49 | 4.50 | 4.47 | 4.52 | 4.50 | 4.80 | 4.67 | 4.63 | 4.59 | 4.38 | 4.33 | 4.26 |
| t50, min | 6.72 | 6.36 | 6.35 | 6.28 | 6.26 | 6.26 | 6.28 | 6.82 | 6.61 | 6.54 | 6.46 | 6.25 | 6.24 | 6.14 |
| t90, min | 21.99 | 20.45 | 19.67 | 17.49 | 17.15 | 15.52 | 14.70 | 14.55 | 14.14 | 14.06 | 13.69 | 13.61 | 15.18 | 14.83 |
| Peak Rate, dNm/min | 1.00 | 1.20 | 1.20 | 1.40 | 1.40 | 1.50 | 1.50 | 0.90 | 1.00 | 1.00 | 0.90 | 0.90 | 0.90 | 0.90 |
| Curve Type | P | SLM | SLM | P | P | P | P | P | P | P | P | P | P | P |
| MDR @ 180° C., .5° Arc, 30 min | | | | | | | | | | | | | | |
| ML, dNm | 1.16 | 1.19 | 1.17 | 1.21 | 1.17 | 1.12 | 1.08 | 1.22 | 1.20 | 1.16 | 1.21 | 1.16 | 1.13 | 1.10 |
| MH, dNm | 8.11 | 8.91 | 9.33 | 10.06 | 10.38 | 10.66 | 10.90 | 7.12 | 7.18 | 7.26 | 7.52 | 7.36 | 7.29 | 7.05 |
| Max-Min, dNm | 6.95 | 7.73 | 8.16 | 8.86 | 9.21 | 9.54 | 9.83 | 5.90 | 5.98 | 6.10 | 6.32 | 6.21 | 6.16 | 5.95 |
| ts2, min | 1.72 | 1.69 | 1.57 | 1.55 | 1.57 | 1.59 | 1.65 | 1.87 | 1.83 | 1.81 | 1.69 | 1.69 | 1.74 | 1.76 |
| t25, min | 1.64 | 1.68 | 1.59 | 1.59 | 1.63 | 1.68 | 1.76 | 1.65 | 1.63 | 1.63 | 1.55 | 1.55 | 1.58 | 1.59 |
| t50, min | 2.14 | 2.16 | 2.05 | 2.05 | 2.09 | 2.17 | 2.32 | 2.25 | 2.22 | 2.19 | 2.07 | 2.05 | 2.1 | 2.11 |
| t90, min | 4.18 | 4.20 | 3.94 | 3.97 | 4.09 | 4.18 | 4.63 | 4.23 | 4.14 | 4.05 | 3.83 | 3.76 | 4.02 | 3.98 |
| Peak Rate, dNm/min | 3.60 | 4.10 | 4.60 | 5.00 | 5.20 | 5.20 | 4.70 | 2.60 | 2.70 | 2.90 | 3.20 | 3.20 | 3.00 | 2.90 |
| Curve Type | P | | SLR | P | P | P | P | SLR | SLR | SLR | SLR | SLR | SLR | P |
| Stress-Strain Unaged, Tested @ RT, Cured @ 150° C. | | | | | | | | | | | | | | |
| Stress @ break (MPa) | 12.23 | 13.09 | 11.66 | 12.19 | 11.48 | 11.93 | 11.15 | 14.35 | 14.35 | 15.62 | 15.35 | 13.97 | 14.40 | 13.85 |
| Stress @ 100% (MPa) | 1.42 | 1.63 | 1.68 | 1.89 | 2.19 | 2.30 | 2.79 | 1.00 | 1.00 | 1.09 | 1.15 | 1.16 | 1.29 | 1.35 |
| Stress @ 135% (MPa) | 1.99 | 2.32 | 2.36 | 2.73 | 3.21 | 3.52 | 4.13 | 1.29 | 1.29 | 1.44 | 1.51 | 1.53 | 1.74 | 1.81 |
| Stress @ 200% (MPa) | 3.36 | 3.95 | 3.89 | 4.72 | 5.42 | 5.94 | 6.83 | 2.09 | 2.09 | 2.35 | 2.49 | 2.46 | 2.87 | 2.92 |
| Stress @ 300% (MPa) | 6.00 | 6.92 | 6.89 | 8.12 | 8.86 | 9.61 | 10.71 | 3.83 | 3.83 | 4.29 | 4.48 | 4.39 | 5.05 | 5.00 |
| % Elongation @ break | 533 | 509 | 462 | 421 | 377 | 376 | 211 | 764 | 808 | 807 | 761 | 727 | 717 | 700 |
| Shore A @ 4 sec. | 48.3 | 49.9 | 49.9 | 49.9 | 51.3 | 52.3 | 52.9 | 42.7 | 43.3 | 44.1 | 43.9 | 45.5 | 45.3 | 45.5 |
| Pierced Dematia Flex, 300 Cycles/min, 60° bend, CYCLES | | | | | | | | | | | | | | |
| 0 | 2.00 | 2.0 | 2.00 | 2.00 | 2.00 | 2.00 | 2.00 | 2.00 | 2.00 | 2.00 | 2.00 | 2.00 | 2.00 | 2.00 |
| 1,500 | 4.10 | 4.10 | 5.10 | 6.60 | 7.95 | 10.70 | 11.80 | 3.50 | 3.10 | 3.10 | 3.20 | 3.20 | 3.20 | 3.40 |
| 3,000 | 4.70 | 4.70 | 6.30 | 8.60 | 10.00 | 13.50 | 16.40 | 3.70 | 3.50 | 3.50 | 3.50 | 3.50 | 3.50 | 3.50 |
| 4,500 | 4.80 | 5.40 | 6.50 | 9.50 | 10.35 | 15.85 | 20.70 | 3.90 | 3.80 | 3.80 | 3.80 | 3.80 | 3.80 | 3.80 |
| 6,000 | 5.50 | 6.20 | 7.60 | 9.85 | 11.15 | 17.45 | 23.90 | 3.90 | 3.90 | 3.90 | 3.90 | 3.90 | 3.90 | 3.90 |

TABLE 5-continued

| RECIPES | 2A | 2B | 2C | 2D | 2E | 2F | 2G | 2H | 2I | 2J | 2K | 2L | 2M | 2N |
|---|---|---|---|---|---|---|---|---|---|---|---|---|---|---|
| 7,500 | 5.70 | 6.45 | 8.10 | 11.00 | 12.30 | 19.15 | 25.00 | 4.00 | 4.00 | 4.00 | 4.00 | 4.00 | 4.00 | 4.00 |
| 9,000 | 6.00 | 6.75 | 8.20 | 11.15 | 13.25 | 20.75 | 25.00 | 4.10 | 4.10 | 4.10 | 4.10 | 4.10 | 4.10 | 4.10 |
| 13,500 | 6.55 | 7.55 | 10.10 | 12.50 | 14.60 | 23.90 | 25.00 | 4.20 | 4.20 | 4.20 | 4.20 | 4.20 | 4.20 | 5.00 |
| 18,000 | 6.90 | 8.05 | 11.10 | 13.40 | 15.95 | 24.55 | 25.00 | 5.60 | 4.70 | 5.00 | 5.25 | 6.80 | 6.75 | 6.75 |
| 36,000 | 7.70 | 9.75 | 13.20 | 15.55 | 19.65 | 25.00 | 25.00 | 5.60 | 4.70 | 5.00 | 5.25 | 6.80 | 6.75 | 6.75 |
| 54,000 | 8.10 | 10.85 | 14.30 | 16.50 | 22.95 | 25.00 | 25.00 | 5.75 | 4.80 | 5.90 | 5.85 | 8.05 | 7.40 | 7.95 |
| 72,000 | 8.95 | 11.60 | 15.70 | 18.10 | 24.20 | 25.00 | 25.00 | 6.00 | 5.00 | 6.50 | 6.55 | 8.45 | 7.90 | 8.15 |
| 90,000 | 9.35 | 11.80 | 17.00 | 19.85 | 24.35 | 25.00 | 25.00 | 6.05 | 5.15 | 6.85 | 6.60 | 9.05 | 8.20 | 8.85 |
| 378,000 | 10.05 | 11.90 | 22.80 | 20.85 | 24.90 | 25.00 | 25.00 | 6.05 | 5.15 | 7.05 | 6.60 | 11.65 | 10.50 | 12.15 |
| 847,165 | 15.60 | 12.40 | 25.00 | 22.00 | 25.00 | 25.00 | 25.00 | 8.25 | 5.20 | 7.05 | 7.15 | 16.90 | 11.05 | 14.55 |
| 1,242,000 | 15.70 | 12.50 | 25.00 | 22.25 | 25.00 | 25.00 | 25.00 | 8.25 | 5.20 | 7.30 | 7.35 | 17.10 | 12.05 | 15.05 |
| 2,200,000 | 16.10 | 12.50 | 25.00 | 22.25 | 25.00 | 25.00 | 25.00 | 8.35 | 5.20 | 7.35 | 7.45 | 17.50 | 14.90 | 15.80 |
| Fatigue-to-Failure, 101% Elong., 100 Cycles/min, Unaged, Tested @ RT, Cured @ 180° C. for 15 min | | | | | | | | | | | | | | |
| 1 | 382,098 | 155446 | 106195 | 142066 | 89762 | 194773 | 109250 | 692186 | 131425 | 366569 | 415308 | 744755 | >1M | >1M |
| 2 | 348919 | 107814 | 105536 | 71838 | 117265 | 63778 | 111594 | 692914 | 290035 | 338539 | 293552 | 62931 | >1M | >1M |
| 3 | 393855 | 110177 | 53523 | 342040 | 53111 | 70859 | 17893 | 536780 | 168475 | 326686 | 543833 | 268469 | >1M | >1M |
| 4 | 357880 | 101538 | 62925 | 131567 | 58382 | 39272 | 82772 | 809775 | 411101 | 319488 | 557428 | 1032000 | >1M | >1M |
| 5 | 448392 | 81502 | 902147 | 236514 | 142532 | 96451 | 27533 | 737100 | 551878 | 263500 | 716738 | 1679504 | >1M | >1M |
| 6 | 554481 | 286427 | 166066 | 469875 | 282887 | 142961 | 25545 | 1358755 | 763175 | 349740 | 562505 | 1143315 | >1M | >1M |
| 7 | 569631 | 307435 | 161290 | 57740 | 276731 | 152161 | 76609 | 1797677 | 603086 | 435001 | 880249 | 1865972 | >1M | >1M |
| 8 | 562373 | 320560 | 130784 | 570482 | 567069 | 327414 | 110034 | 1504745 | 244402 | 504176 | 689401 | 673777 | >1M | >1M |
| Mean | 452166 | 183862 | 211058 | 252765 | 198467 | 123459 | 70154 | 1016242 | 395447 | 362962 | 582377 | 937590 | >1M | >1M |
| Rounded Off (× 1000) | 452 | 184 | 211 | 253 | 199 | 124 | 70 | >1M | 395 | 363 | 582 | 938 | | |
| Ozone Static - Bent Loop @ 40° C. & 25 pphm of O3 | | | | | | | | | | | | | | |
| Test Duration/Days | 0 | 0 | 0 | 0 | 0 | 0 | 0 | 0 | 0 | 0 | 0 | 0 | 0 | 0 |
| | 31 | 31 | 31 | 31 | 31 | 31 | 31 | 31 | 31 | 31 | 31 | 31 | 31 | 31 |
| Rating | Excel | Excel | Excel | Excel | Excel | Excel | Excel | Excel | Excel | Excel | Excel | Excel | Excel | Excel |
| Ozone Dynamic - Tensile @ 40° C. & 25 pphm of O3 | | | | | | | | | | | | | | |
| Crack 1, Days/Type of Crack | 17.4 | 0 | 0 | 0 | 0 | 0 | 0 | 7.4 | 0 | 0 | 0 | 0 | 0 | 0 |
| Crack 2, Days/Type of Crack | 26.5 | 0 | 0 | 0 | 0 | 0 | 0 | 13.5 | 0 | 0 | 0 | 0 | 0 | 0 |
| Test Duration/Days | 31 | 31 | 31 | 31 | 31 | 31 | 31 | 31 | 31 | 31 | 31 | 31 | 31 | 31 |
| Rating | Poor | Excel | Excel | Excel | Excel | Excel | Excel | Poor | Excel | Excel | Excel | Excel | Excel | Excel |
| Outdoor Flex | | | | | | | | | | | | | | |
| Crack 1, Days/Type of Crack | 10.1 | 24.6 | 0 | 0 | 0 | 0 | 0 | 4.2 | 10.1 | 24.1 | 24.1 | 24.1 | 24.1 | 24.1 |
| Crack 2, Days/Type of Crack | 28.1/6 | 31.1/6 | 0 | 0 | 0 | 0 | 0 | 7.2/6 | 21.2 | 0 | 0 | 0 | 0 | 0 |
| Crack 3, Days/Type of Crack | 0 | 0 | 0 | 0 | 0 | 0 | 0 | 10.3/6 | 38.3 | 0 | 0 | 0 | 0 | 0 |
| Crack 4, Days/Type of Crack | 0 | 0 | 0 | 0 | 0 | 0 | 0 | 0 | 31.3/6 | 0 | 0 | 0 | 0 | 0 |
| Test Duration/Days | 41 | 41 | 41 | 41 | 41 | 41 | 41 | 41 | 41 | 41 | 41 | 41 | 41 | 41 |
| Rating | Fair | Fair | Excel | Excel | Excel | Excel | Excel | Poor | Poor | Poor | Fair | Fair | Fair | Fair |

These results show that blends with Copolymer 2 had cure characteristics comparable or slightly better than blends with the EXXPRO 93-4, better tensile properties, comparable hardness, substantially better flex crack propagation resistance, better fatigue-to-failure, and better static and dynamic ozone resistance.

EXAMPLE 3

Master batches of brominated isobutylene/para-methylstyrene copolymers of varying bromination level, comonomer content and molecular weight were prepared. The copolymers had the properties listed in Table 6.

TABLE 6

| | COPOLYMER | | |
|---|---|---|---|
| PROPERTY | EXXPRO 90-10 | Test 1 | Test 2 |
| Para-Methylstyrene (wt %) | 7.5 | 10.0 | 12.5 |
| Bromomethylstyrene (mol %) | 1.2 | 0.96 | 0.84 |
| Mooney Viscosity (ML(1 + 8)125° C.) | 45 ± 5 | 39 ± 5 | 46 ± 5 |

Test compositions were compounded to blend the master batch components and the cure additives listed in Table 7. Three-pass mixing conditions were used for samples 1W, 1X and 1Y. Two-pass mixing conditions were used for sample 1Z. BUDENE™ 1207 is a trademarked butadiene rubber available from Goodyear. FLEXON 641 is a naphthenic petroleum oil. FLEXON 815 is a paraffinic petroleum oil.

TABLE 7

| RECIPES | 1W | 1X | 1Y | 1Z |
|---|---|---|---|---|
| Master Batch (phr) | | | | |
| EXXPRO 90-10 | 40.00 | | | |
| Test 1 | | 50.00 | | |
| Test 2 | | | 50.00 | |
| BUDENE 1207 | 50.00 | 41.67 | 41.67 | 50.00 |
| SMR | 10.00 | 8.33 | 8.33 | 50.00 |
| Black N330 | 55.00 | 40.00 | 40.00 | |
| Black N660 | | | | 50.00 |
| FLEXON 641 | | 12.00 | 12.00 | 10.00 |
| FLEXON 815 | 12.00 | | | |
| STRUKTOL 40MS | 5.00 | 4.00 | 4.00 | |
| ESCOREZ 1102 | 3.00 | 5.00 | 5.00 | 5.00 |
| SP 1068 | 3.00 | 2.00 | 2.00 | |
| 6PPD | | | | 3.00 |
| TMQ | | | | 1.00 |
| Sunolite 240 | | | | 3.00 |
| Cure Package (phr) | | | | |
| Stearic Acid | 1.00 | 0.50 | 0.50 | 2.00 |
| Zinc Oxide | 1.00 | 0.75 | 0.75 | 3.00 |
| Sulfur | 0.32 | 0.40 | 0.40 | 1.00 |
| RYLEX 3011 | 0.50 | 0.60 | 0.60 | |
| MBTS | 1.50 | 0.80 | 0.80 | |
| DHT4A2 | 0.50 | | | |
| TBBS | | | | 2.00 |
| TOTAL PHR | 182.82 | 166.05 | 166.05 | 180.00 |

The test compositions (1W through 1Z) were tested for cure characteristics, tensile strength, flex fatigue, adhesion and ozone resistance. The results are presented in Table 8.

TABLE 8

| PROPERTIES | 1W | 1X | 1Y | 1Z |
|---|---|---|---|---|
| Mooney Viscosity 1 + 4 @ 100° C. | 74 | 55 | 58 | 51 |
| Mooney Scorch @ 121° C. | | | | |
| 5 MU, min | 23.4 | 30.7 | 30.2 | 30.7 |
| 10 MU, min | 28.4 | 35.7 | 35.2 | 35.7 |
| MDR @ 180° C., 0.5° Arc | | | | |
| ML, dNm | 1.88 | 1.00 | 1.18 | 1.48 |
| MH, dNm | 11.31 | 8.17 | 7.63 | 11.12 |
| ts2, min | 1.45 | 1.89 | 1.88 | 1.31 |
| t25, min | 1.57 | 1.83 | 1.75 | 1.39 |
| t50, min | 2.14 | 2.35 | 2.30 | 1.68 |
| t90, min | 3.50 | 4.49 | 4.38 | 2.26 |
| Peak Rate; dNm,/min | | | | |
| Curve Type | | | | |
| Stress-Strain, Unaged, Tested @ RT, Cured @ 180° C. | | | | |
| Time of Cure (min) | 7.0 | 7.0 | 7.0 | 5.0 |
| Stress @ break (MPa) | 15.9 | 11.6 | 12.7 | 16.4 |
| Stress @ 100% (MPa) | 1.9 | 1.5 | 1.4 | 1.3 |
| Stress @ 300% (MPa) | 7.8 | 6.0 | 5.1 | 6.6 |
| % Elongation @ break | 580 | 509 | 639 | 556 |
| Shore A | 54.0 | 45.0 | 43.0 | 46.0 |
| Outdoor Flex @ 672 hours, 0 = Broken; 10 = No cracks | 4 | 9 | 10 | 7 |
| Pierced Demattia Flex @ 1,307,890 cycles | 12.75 | 16.10 | 8.15 | 7.40 |
| Fatigue-to-Failure, 101% Elong., 100 Cycles/min, Unaged, Tested @ RT | 73,706 | 72,137 | 215,166 | 378,980 |
| Die B Tear @ 100° C. | 238 | 72 | 101 | 147 |
| Die C Tear @ 100° C. | 188 | 93 | 101 | 143 |
| 1" Strip Adhesion to "Carcass" Tested @ 100° C. | | | | |
| Avg. Peak (lb) | 91 | 93 | 115 | 118 |
| Surface Appearance | T | P | P | P |
| 1" Strip Adhesion to "Self" Tested @ 100° C. | | | | |
| Avg. Peak (lb) | 69 | 100 | 127 | 112 |
| Surface Appearance | T | P | P | P |
| Dynamic Ozone, 50 pphm, 60% Extension, Hrs. to First Crack | <24; <24 | <48; <48 | NC @ 336; 336 | <48; <48 |

Blends 1X and 1Y exhibited superior outdoor flex and ozone resistance over blends 1W and 1Z. The test compositions (1W through 1Z) were used to re-side tires. Tests were conducted on the tires to measure wear and ozone resistance. The results are presented in Table 9.

TABLE 9

| PROPERTIES | 1W | 1X | 1Y | 1Z |
|---|---|---|---|---|
| 5% Deflection, 18,550 miles | | | | |
| Cracking | none | none | none | slight |
| Color | good | good | good | brown bloom |
| 10% Deflection, 18,500 miles | | | | |
| Cracking | none | none | none | slight |
| Color | moderate stain | good | good | brown bloom |
| Flexsys Ozone Wheel Test, 500 hours, 10 = no cracks, 0 = failure | 6 | 8 | 10 | 6 |

Blends 1X and 1Y exhibited superior wear characteristics to blends 1W and 1Z. Blends 1X and 1Y also exhibited superior ozone resistance over blends 1W and 1Z.

We claim:

1. A multi-layer tire sidewall comprising at least one outer layer and at least one inner layer, the outer layer comprising a blend of a rubber and a copolymer of an isoolefin, para-alkylstyrene and bromoalkylstyrene, wherein the amount of bromoalkylstyrene and the para-alkylstyrene in the copolymer are represented by the following formula:

$$X=[1.91-(0.094 \times Y)] \pm 0.1$$

wherein "X" is mole percent bromoalkylstyrene and "Y" is the weight percent of para-alkylstyrene and has a value of from 9.5 to 20.

2. The tire sidewall in accordance with claim 1, wherein the rubber is selected from natural rubber, styrene-butadiene rubber, butyl rubber, halobutyl rubber, polybutadiene rubber, polyisoprene rubber and combinations thereof.

3. The tire sidewall in accordance with claim 1, wherein the rubber is present from 35 to 65 phr of the blend.

4. The tire sidewall in accordance with claim 1, wherein the blend comprises one outer layer of the tire sidewall.

5. The tire sidewall in accordance with claim 1, wherein the outer layer also comprises EPDM rubber.

6. The tire sidewall in accordance with claim 5, wherein the EPDM rubber is present from 5 to 20 phr of the blend.

7. The tire sidewall in accordance with claim 1, wherein the rubber is natural rubber.

8. The tire sidewall in accordance with claim 7, wherein the copolymer and rubber are present in a ratio of from 0.28:1 by weight.

9. The tire sidewall in accordance with claim 1, wherein the multi-layer tire sidewall also includes an at least one inner layer comprising a unsaturated rubber or blend of unsaturated rubber.

10. The tire sidewall in accordance with claim 9, wherein the unsaturated rubber is selected from natural rubber, butyl rubber, halobutyl rubber, styrene-butadiene rubber, polybutadiene rubber, or combinations thereof.

11. The tire sidewall in accordance with claim 1, wherein the isoolefin is isobutylene and the bromoalkylstyrene is para-bromomethylstyrene.

12. The tire sidewall in accordance with claim 1, wherein the para-alkylstyrene is para-methylstyrene.

13. The tire sidewall in accordance with claim 4, wherein the outer layer also comprises a filler selected from carbon black and silica, and combinations thereof.

14. The tire sidewall in accordance with claim 9, wherein the inner layer also comprises a filler selected from carbon black and silica, and combinations thereof.

15. The tire sidewall in accordance with claim 1, wherein the copolymer is present from 35 to 65 phr of blend.

* * * * *